United States Patent
Sullivan et al.

(10) Patent No.: US 11,474,659 B2
(45) Date of Patent: Oct. 18, 2022

(54) SYSTEM AND METHODS FOR DEVICE INTERACTION USING A POINTING DEVICE AND ATTENTION SENSING DEVICE

(71) Applicant: Mirametrix Inc., Montreal (CA)

(72) Inventors: Nicholas J. Sullivan, Montreal (CA); Martin Gamsby, Montreal (CA)

(73) Assignee: Mirametrix Inc., Montreal (CA)

( * ) Notice: Subject to any disclaimer, the term of this patent is extended or adjusted under 35 U.S.C. 154(b) by 0 days.

(21) Appl. No.: 17/128,455

(22) Filed: Dec. 21, 2020

(65) Prior Publication Data

US 2021/0109641 A1  Apr. 15, 2021

Related U.S. Application Data

(63) Continuation of application No. 16/406,908, filed on May 8, 2019, now Pat. No. 10,871,874.

(60) Provisional application No. 62/669,138, filed on May 9, 2018.

(51) Int. Cl.
  *G06F 3/04812* (2022.01)
  *G06F 3/0354* (2013.01)
  *G06F 3/041* (2006.01)
  *G06F 3/04892* (2022.01)

(52) U.S. Cl.
  CPC ...... *G06F 3/04812* (2013.01); *G06F 3/03547* (2013.01); *G06F 3/0412* (2013.01); *G06F 3/04892* (2013.01)

(58) Field of Classification Search
  CPC .... G06F 3/013; G06F 3/03547; G06F 3/0412; G06F 3/0481; G06F 3/0487; G06F 3/04883; G06F 3/08482
  See application file for complete search history.

(56) References Cited

U.S. PATENT DOCUMENTS

| | | |
|---|---|---|
| 3,541,541 A | 11/1970 | Engelbart |
| 5,689,619 A | 11/1997 | Smyth |
| 6,031,531 A * | 2/2000 | Kimble ............. G09B 21/00 345/157 |
| 6,204,828 B1 | 3/2001 | Amir et al. |
| 6,323,884 B1 | 11/2001 | Bird et al. |
| 6,559,873 B1 | 5/2003 | Dawkins et al. |
| 7,013,258 B1 | 3/2006 | Su et al. |
| 7,762,665 B2 | 7/2010 | Vertegaal et al. |
| 8,120,577 B2 | 2/2012 | Bouvin et al. |

(Continued)

FOREIGN PATENT DOCUMENTS

KR   1020150085556 B1   11/2016

OTHER PUBLICATIONS

Module—definition of module by The Free Dictionary; www.thefreedictionary.com/module; published Sep. 29, 2021. (Year: 2021).*

*Primary Examiner* — Mihir K Rayan

(74) *Attorney, Agent, or Firm* — Christopher N. Hunter; Laurie C. Wright; Blake, Cassels & Graydon LLP

(57) ABSTRACT

A system and methods are provided to manage gestures and positional data from a pointing device, considering an attention sensing device with known accuracy characteristics. The method uses the state of the user's attention and the pointing device data as input, mapping them against pre-defined regions on the device's screen(s). It then uses both the mapping results and raw inputs to affect the device, such as sending instructions or moving the pointing cursor.

20 Claims, 12 Drawing Sheets

(56) References Cited

U.S. PATENT DOCUMENTS

| | | | |
|---|---|---|---|
| 8,185,845 B2 | 5/2012 | Bjorklund et al. | |
| 8,793,620 B2* | 7/2014 | Stafford | G06F 3/0485 |
| | | | 715/858 |
| 9,213,404 B2 | 12/2015 | Elvesjo et al. | |
| 9,274,598 B2 | 3/2016 | Beymer et al. | |
| 9,459,694 B2* | 10/2016 | Haddon | G06F 3/03543 |
| 10,241,570 B2 | 3/2019 | Nakayana et al. | |
| 10,496,186 B2 | 12/2019 | Yasuda et al. | |
| 2002/0158846 A1 | 10/2002 | Clapper | |
| 2005/0047629 A1 | 3/2005 | Farrell et al. | |
| 2013/0169560 A1 | 7/2013 | Cederlund et al. | |
| 2014/0247232 A1 | 9/2014 | George-Svahn et al. | |
| 2016/0048223 A1* | 2/2016 | Taguchi | G06F 3/0346 |
| | | | 345/157 |
| 2016/0313891 A1* | 10/2016 | Tsuda | G06F 3/013 |

* cited by examiner

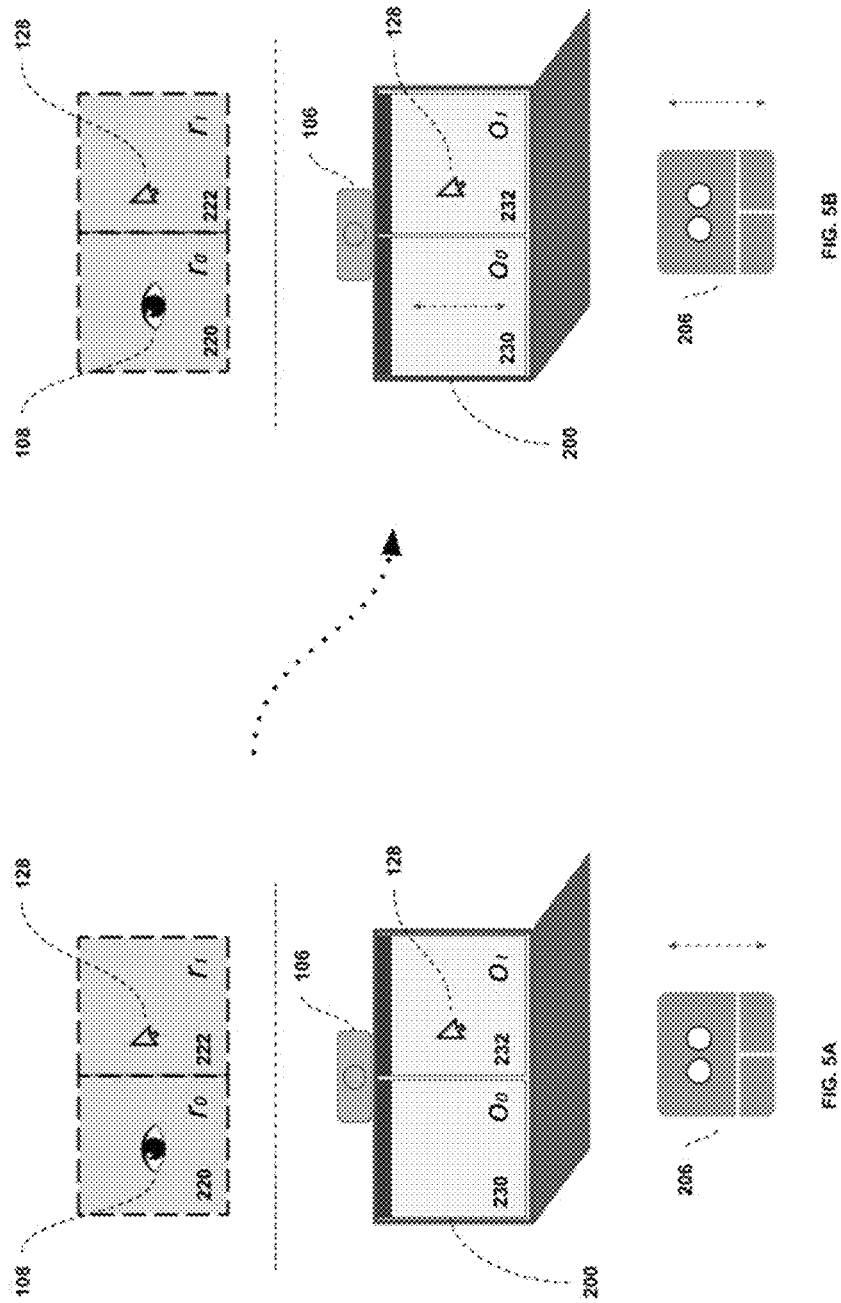

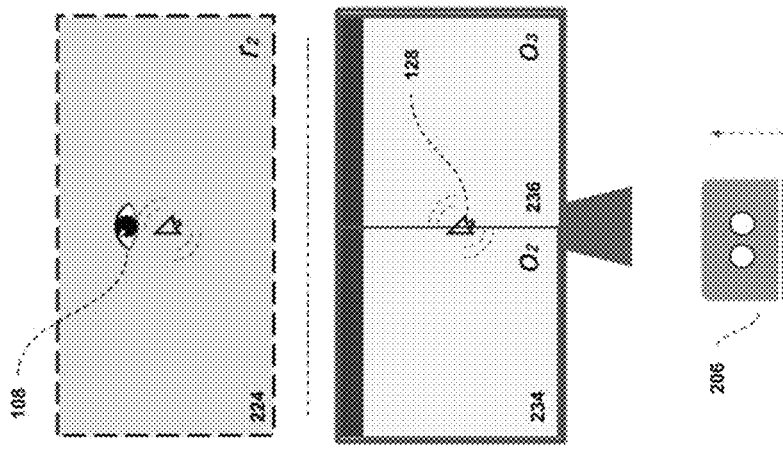
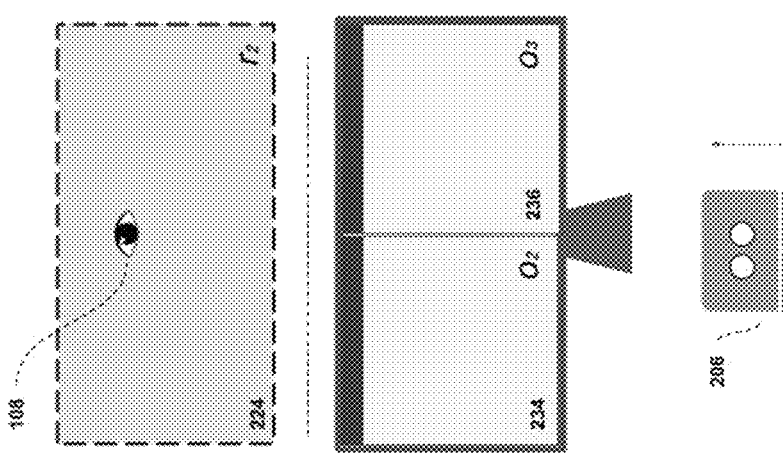

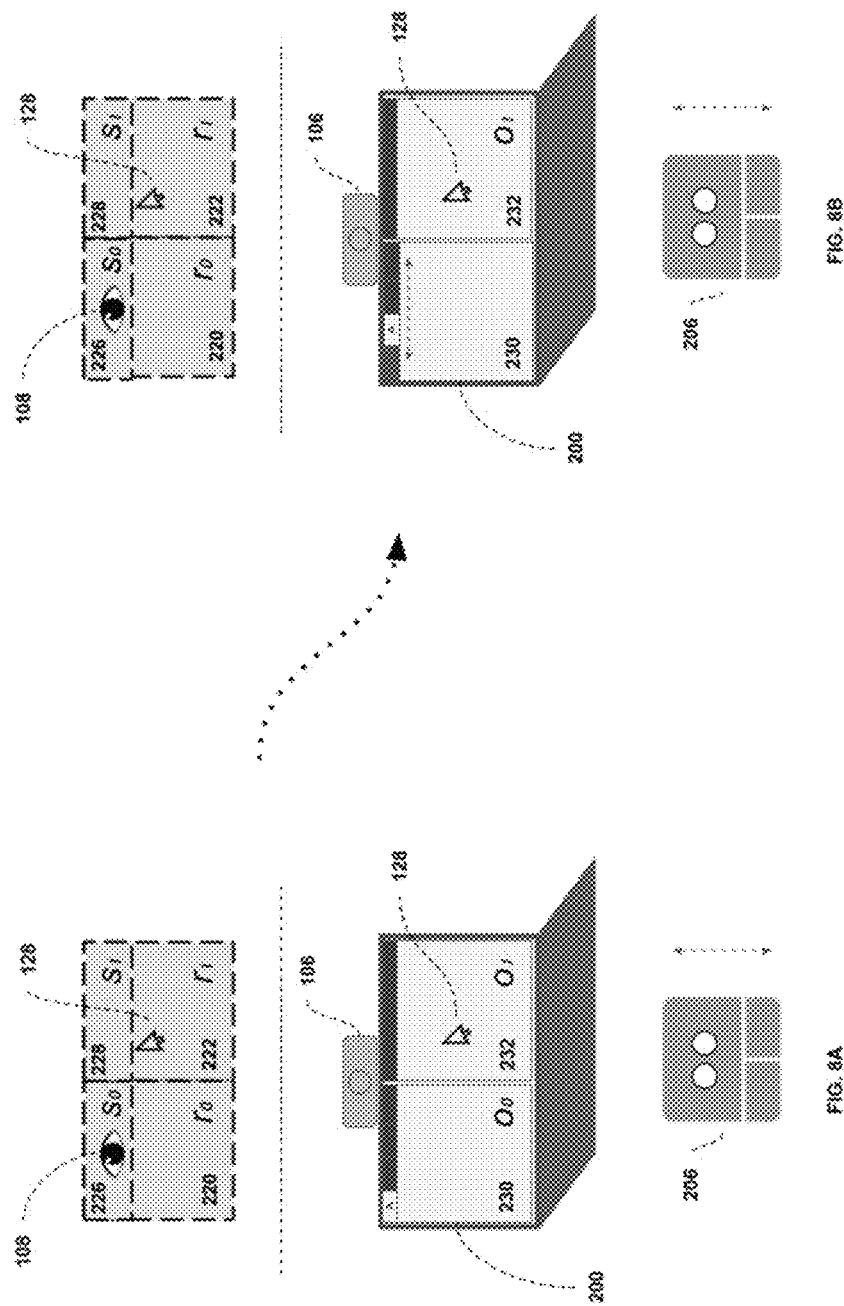

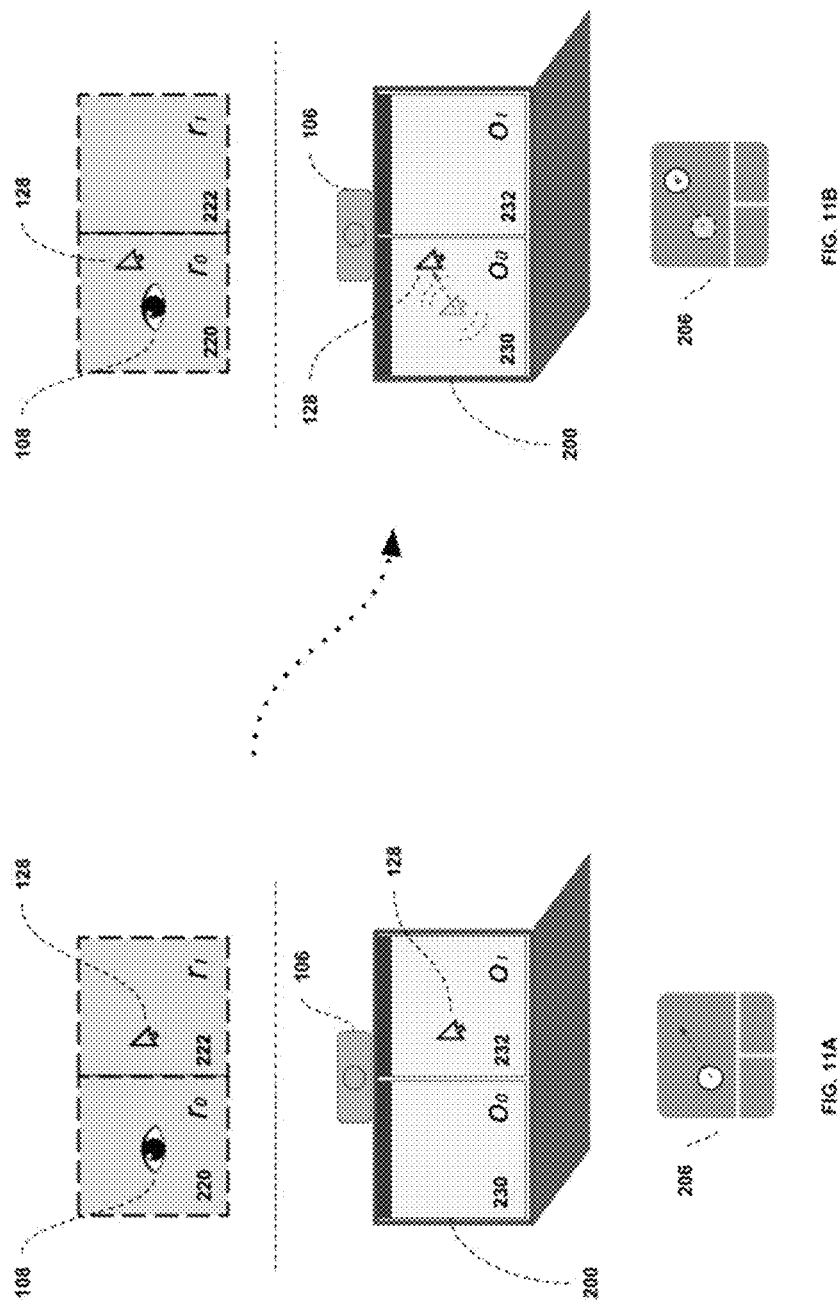

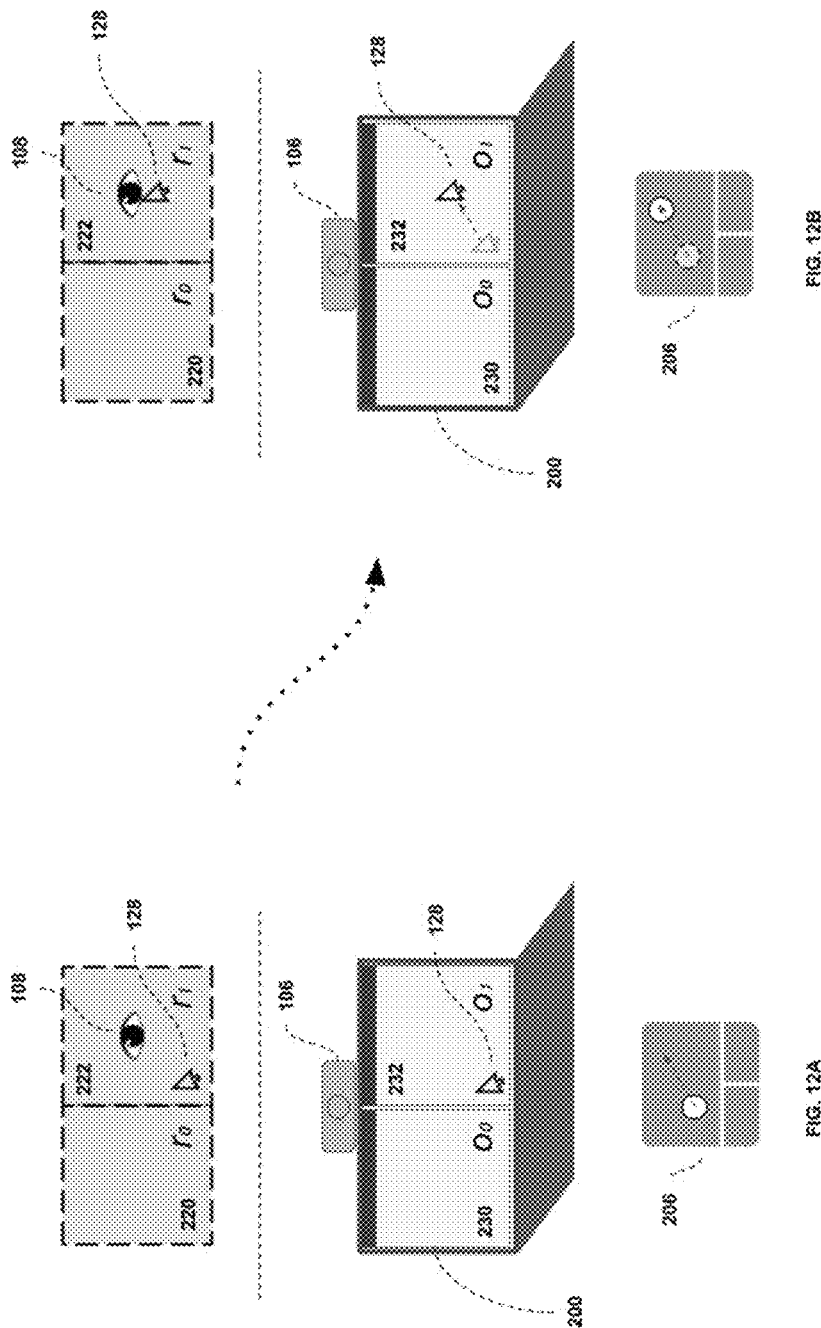

SYSTEM AND METHODS FOR DEVICE INTERACTION USING A POINTING DEVICE AND ATTENTION SENSING DEVICE

CROSS-REFERENCE TO RELATED APPLICATION(S)

This application is a continuation of U.S. application Ser. No. 16/406,908 filed on May 8, 2019, which claims priority to U.S. Provisional Patent Application No. 62/669,138 filed on May 9, 2018, both of which are incorporated herein by reference in their entireties.

TECHNICAL FIELD

The following relates generally to a system and methods for device interaction using a pointing device and attention sensing device.

BACKGROUND

Currently, there exist a number of methods which allow interaction with a device considering either a pointing device, an attention sensing device, or the combination of the two.

Regarding interaction systems which only consider a pointing device, these date back to the introduction of the mouse and Windows, Icon, Mouse, Pointer (WIMP) interaction scheme that has been the foundation of human-computer interaction since at least the 1960s (see U.S. Pat. No. 3,541,541A and US20020158846A1). In them, a pointing device capable of providing some measure of change in position is used by a control interface to move a cursor in an interactable space. The pointing device can also send gestures, which are fed to a control interface, which then sends an associated instruction to the exact point where the cursor is located in the interactable space.

While completely functional, the main limitations of such an approach relate to: (a) the requirement to send instructions to the exact cursor position; and (b) the requirement to move the cursor using a singular input device for all motion types. Tied to the first point: there are many cases where a user wishes to send a gesture to an object within the interactable space, where the gesture could be sent to any point within a large region (such as scrolling a word processing document). Because the paradigm requires the cursor to be over the area, the user must move the cursor to be over some portion of the region in order to send the gesture. This is a case of a very high-accuracy device being used to indicate the location of something which a much lower-accuracy device could indicate. To the second point, many pointing devices, having a defined sensitivity, will usually be very good at fine cursor motion but requires "shuffling" for large, coarse motions (i.e. moving, picking up and returning to a position, then moving again).

These aspects of pointing device interaction schemes caused others to consider the value of using user attention to improve the interaction scheme. From this concept, a number of methods combining an attention sensing device and a pointing device were developed. These can be segmented into cursor-augmentation systems and attention-driven systems.

The category of attention-driven systems generally function by using an indication of user attention to decide where to send an instruction, and an input gesture to determine what instruction to send (whether it is received from the same device, via dwell-time, or from a separate input device, such as a touchpad). Exemplary solutions include, for example: US20130169560A1, U.S. Pat. No. 8,120,577B2, US20050047629A1, and U.S. Pat. No. 9,274,598B2. This interaction scheme effectively replaces the cursor paradigm, as it is no longer necessary to define where an instruction is sent. However, in doing so, it in essence requires that all interactable elements are sized in accordance with the supported accuracy of the attention sensing device. If interactable elements are not sized properly, either certain elements cannot be interacted with or a separate device or pointing device is required. Therefore, it either requires a completely redefined device interface, or a secondary pointing device to handle small interactable elements.

An extension of the attention-driven systems replaces the separate input device with an implicit determination of user intent, as in U.S. Pat. No. 7,762,665B2. In this case, the user interacts exclusively with their attention and an estimated indication of intent. In addition to having the limitations described of attention-driven systems, this approach demands an incredibly reliable intent estimation system. Without one, the interaction is likely to be very error-prone and confusing for the user.

The category of cursor-augmentation systems functions under the hypothesis that fine cursor motions should be managed by a pointing device, and coarse cursor motion should be managed by user attention. Therefore, they generally define a region around the cursor based on the accuracy of the attention sensing device; if at any instant pointing device motion is detected and the user's attention is outside of the region surrounding the cursor, cursor motion is accelerated relative to, or snapped to, the attention position. Otherwise, the pointing device motion directly affects the cursor position. Regarding input gestures: this approach sends instructions to the cursor position (like pointing-device interaction schemes), under the assumption that the cursor motion augmentation is sufficient. A solution associated with this approach is found in U.S. Pat. No. 6,204,828B1. An augmentation of this involves varying the cursor speed as it moves from one position to another, depending on the displacement between the cursor position and the attention position (see U.S. Pat. No. 8,793,620B2).

A significant issue related to cursor-augmentation systems lies in the method by which they choose to snap the cursor to the attention position or not. Since these are relative to the cursor position and the attention sensing device accuracy, it is difficult for the user to create a consistent mental model of how the system will function. This, coupled with the user being accustomed to the traditional pointing-device-only interaction scheme, causes users to consider the paradigm buggy or broken, and abandon it. Separate from this, if the snapping logic is not fine-tuned to the accuracy of the attention sensing device (which may vary based on user position and orientation), the system behaves erratically, also causing users to abandon it.

In addition to the above, there are two added deficiencies to cursor-augmentation systems: requiring added steps to the user for performing an action; and limiting the type of user attention that can be considered. Regarding the first, if a user wants to send an instruction to a relatively large object in the interactable space, he or she first moves the cursor to the location desired, then sends the gesture. This is at least one added step to attention-driven systems, where the user simply sends the instruction to where he or she is looking. It should be noted that, with a sufficiently accurate and quick-to-respond attention sensing device, this point may be moot. Regarding the second point: by solely using attention information to assist the cursor, these systems limit attention sensing to considering either (a) absolute attention position in the interactable space; or (b) relative attention position in relation to the cursor position. That is, they do not consider additional sources of information, such as the objects that exist in the scene or a predefined relative origin. Granted, this is again unimportant if the attention sensing device is quite accurate.

In summary, this highlights the dependence of cursor-augmentation systems on high-accuracy, fast-response attention sensing devices, which may not be available for a particular computing device.

It would be desirable for a user performing any given task on a device to be able to do so considering the current focus of their attention, to enable a natural and efficient interaction with the device. For a high proportion of the interactions a user performs with consumer electronics, the accuracy warranted by a pointing device is unnecessarily high. Even so, with most existing user interfaces use of some form of pointing device is still necessary, since the accuracy and precision of attention sensing devices is rarely constant to the full variability in the user population, position and orientation in the scene, and scene ambient illumination. Therefore, it would also be desirable for devices to be enabled to consider both user attention and pointing device input when interacting with them. However, existing methods require either a pointing device in conjunction with an attention sensing device and a gesture device; or, they modify the cursor function (considering attention), limiting the interaction scheme and requiring high-end attention sensing devices. Thus, it would also be desirable to have an interaction scheme which: (a) seamlessly merges pointing device and user attention inputs, such that the two input systems can co-exist independently; and (b) is flexible to attention sensing devices of varying accuracy and precision.

SUMMARY

In one aspect, there is provided a control module for positioning a cursor during user interaction with a scene shown on one or more displays, wherein said control module is configured to: receive user input from a pointing device configured to at least detect positional or change-in-positional information; receive user attention data from an attention sensing device, wherein the attention data is output as one or more points on the one or more displays; receive a predefined set of regions within the one or more displays, said regions being defined by respective coordinates and dimensions, and said regions describing a supported granularity of the attention sensing device; receive the current cursor position in the scene from a device; determine an attention region from the set of regions and attention data; determine a cursor region from the set of regions, pointing device positional information, and current cursor position; check whether the attention region and cursor region do not correspond to the same region once change-in-positional information has been received from the pointing device; and move the cursor to a predetermined location within the attention region when determining the attention region and cursor region do not correspond to the same region; or move the cursor within the cursor region in accordance with the pointing device positional information.

In another aspect, there is provided a control module for generating gesture based commands and positioning a cursor during user interaction with a scene shown on one or more displays, wherein said control module is configured to: receive user input from a pointing device capable of detecting positional or change-in-positional information, and user generated gestures; receive user attention data from an attention sensing device, wherein the attention data is output as one or more points on the one or more displays; receive a predefined set of regions within the one or more displays, said regions being defined by respective coordinates and dimensions, and said regions describing a supported granularity of the attention sensing device; receive coordinate and dimensional information for all objects in the scene from an object tracker; receive the current cursor position in the scene from a device; determine an attention region from the set of regions and attention data; determine a cursor region from the set of regions, pointing device positional information, and current cursor position; check whether the attention region and cursor region do not correspond to the same region upon receiving one or more user generated gestures; upon determining the attention region and cursor region do not correspond to the same region, check whether the attention region contains only one object within it; or execute at least one user action based on at least one user generated gesture, wherein said user action is executed with the current cursor position as a starting point; and after determining the attention region contains only one object within it, execute at least one user action based on at least one user generated gesture, wherein said user action is executed with a predetermined location within the attention region as a starting point; or move the cursor position to a predetermined location within the attention region.

In yet another aspect, there is provided a method for positioning a cursor during user interaction with a scene shown on one or more displays, said method comprising: receiving user input from a pointing device configured to at least detect positional or change-in-positional information; receiving user attention data from an attention sensing device, where the attention data is output as one or more points on the one or more displays; receiving a predefined set of regions within the one or more displays, said regions being defined by respective coordinates and dimensions, and said regions describing a supported granularity of the attention sensing device; receiving a current cursor position in the scene from a device; determining an attention region from the set of regions and attention data; determining a cursor region from the set of regions, pointing device positional information, and current cursor position; checking whether the attention region and cursor region do not correspond to the same region once change-in-positional information has been received from the pointing device; and moving the cursor to a predetermined location within the attention region when determining the attention region and cursor region do not correspond to the same region; or moving the cursor within the cursor region in accordance with the pointing device positional information.

In yet another aspect, there is provided a method for generating gesture based commands and positioning a cursor during user interaction with a scene shown on one or more displays, said method comprising: receiving user input from a pointing device capable of detecting positional or change-in-positional information and user generated gestures; receiving user attention data from an attention sensing device, wherein the attention data is output as one or more points on the one or more displays; receiving a predefined set of regions within the one or more displays, said regions being defined by respective coordinates and dimensions, and said regions describing a supported granularity of the attention sensing device; receiving coordinate and dimensional information for all objects in the scene from an object tracker; receiving a current cursor position in the scene from a device; determining an attention region from the set of regions and attention data; determining a cursor region from the set of regions, pointing device positional information, and current cursor position; checking whether the attention region and cursor region do not correspond to the same region upon receiving one or more user generated gestures; upon determining the attention region and cursor region do not correspond to the same region, checking whether the attention region contains only one object within it; or executing at least one user action based on at least one user generated gesture, wherein said user action is executed with the current cursor position as a starting point; and after determining the attention region contains only one object within it, executing at least one user action based on at least one user generated gesture, wherein said user action is executed with a predetermined location within the attention region as a starting point; or moving the cursor position to a predetermined location within the attention region.

BRIEF DESCRIPTION OF THE DRAWINGS

Embodiments will now be described with reference to the appended drawings wherein:

FIGS. 5A and 5B illustrate the gesture logic case where the attention region and cursor region are not the same, and the attention region is a supported region.

FIGS. 6A and 6B illustrate the gesture logic case where the attention region and cursor region are not the same, but the attention region is not a supported region.

FIGS. 8A and 8B illustrate a gesture logic considering the added concept of sub-regions.

FIGS. 11A and 11B illustrates the cursor control logic case where the attention region and cursor region are not the same.

FIGS. 12A and 12B illustrates the cursor control logic case where the attention region and cursor region are the same.

DETAILED DESCRIPTION OF THE DRAWINGS

Figure 1:
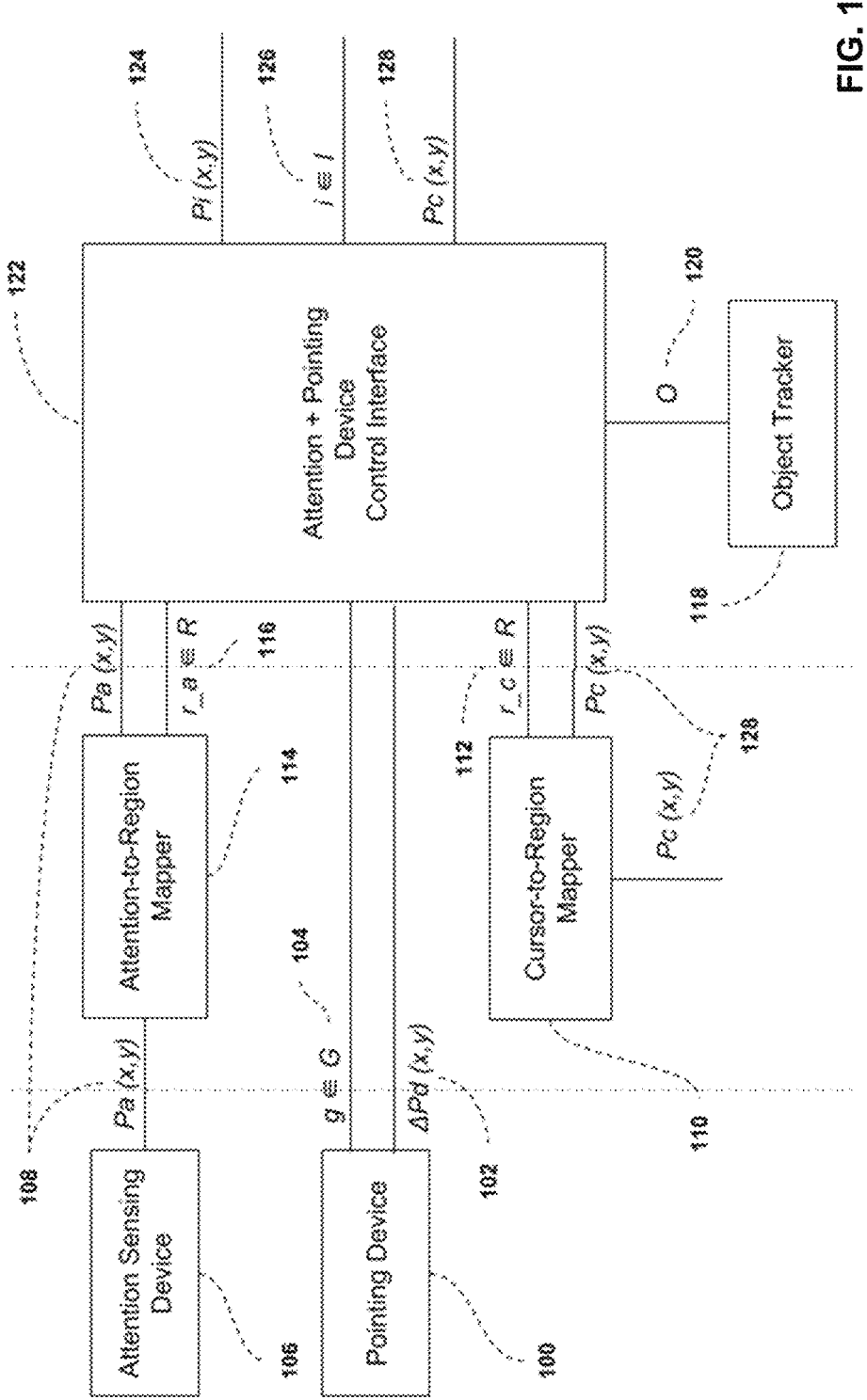
FIG. 1 provides an overview of the various components associated with the system.

Embodiments now will be described more fully hereinafter with reference to the accompanying drawings, which are intended to be read in conjunction with the summary, the detailed description and any preferred and/or particular embodiments specifically discussed or otherwise disclosed. The principles may, however, be embodied in many different forms and should not be construed as limited to the embodiments set forth herein; rather, these embodiments are provided by way of illustration only and so that this disclosure will be thorough, complete and will fully convey the scope of the claims appended hereto.

The following advantageously addresses the aforementioned deficiencies by providing a system and methods for device interaction using a pointing device and attention sensing device, which provides a paradigm allowing input gestures and cursor motion to be routed to where the user's attention is with the highest accuracy possible.

The method receives as input the location of the user's attention, as well as the position of a cursor controlled by a pointing device. The method first maps both the attention location and the cursor location to a set of regions on the displays presented to the user. The control interface then uses the mapped and raw inputs, as well as the known objects displayed to the user to assess the state of the system. Finally, depending on the nature and state of the inputs, the control interface will perform one or more actions, such as outputting a certain number of instructions in specific locations, or modifying the position of the cursor.

The system and method will generally be applied to situations where the attention sensing device accuracy can at least differentiate between the predefined set of regions. While it is able to function when the accuracy perfectly matches the region sizes, there are benefits to having higher accuracy in the attention sensing. In cases of higher accuracy, the control interface can consider sub-regions for each region, which overlap certain key features of the displayed objects. This allows the control interface to provide different instructions to an object given the same input gesture, by mapping different instructions to different sub-regions. It additionally allows the control interface to decide where in the attention region to move the cursor (i.e. at a lower granularity than just the full region).

The system and method will generally be applied to situations where the object tracker only knows the position and size of objects presented to the user. In the case where the control interface has more information about the content and internal arrangement of these objects, it may also increase the functionality of the device. In general, this additional information can allow the control interface to provide different instructions to different objects, given the same input gesture; as well as move the cursor within the object with a lower granularity. With respect to the first case: because it cannot be guaranteed that all objects associate the same input instructions with the same action, it may be necessary to modify the input instruction sent based on the object it is being sent to. For example, the action of changing the active tab of an application may be associated with the input key code "Ctrl+T" for some applications, but require the key code "Ctrl+PgUp" for others. In this example, each application is an object detected by the object tracker. With respect to the second case: if it is known that only a particular area of an object corresponds to an interactable area, the cursor may be moved to the center of the interactable area, rather than the center of the object itself.

The system and method can also be optionally configured to allow activation gestures to be provided. These "pre-gesture" gestures allow the device to do at least one of: provide visual feedback to the user until the gesture is begun; and switch to providing relative attention information (i.e. setting an "origin" for the data). The visual attention is useful to more easily allow the user to select where their attention will be sent. The relative attention information switch can be used to allow a higher accuracy to the interaction as it introduces a predefined "origin" to the attention data, which the system uses as reference for subsequent data for that gesture interaction.

Additionally, the system and method can be configured to manage cursor hiding and re-displaying. This can be done to increase the likelihood of the user being aware of his or her cursor's location, as it hides it after not being used for a predetermined period of time.

The presently described system differentiates itself from existing solutions in a number of ways. Firstly, it allows the sending of gestures to the attention region and cursor position seamlessly via a single pointing device, without changing the traditional pointing device paradigm. Secondly, by defining a set of evaluated regions explicitly, it allows these to be presented to the user. Thus, the user can form a clear mental model of the interaction paradigm, since there is no dynamic component to it. Thirdly, it provides a seamless way to inform the user when it cannot determine which object to send a gesture to, while simplifying the effort required to clarify the object desired (and resend a gesture).

The overall system and methods described are structurally distinct from other available solutions in that: (a) it is a paradigm that determines whether to send instructions to the region of attention or the cursor position depending on internal logic (where existing solutions only send instructions to one or the other); (b) it considers knowledge of the objects in the scene and predefined regions in order to decide where to send instructions (where existing solutions either only consider objects in the scene or only consider the interactable space dimensions); and (c) it determines whether to move the cursor to the attention region or pass-through the pointing device motion to the cursor, depending on internal logic including a predefined set of regions (where existing solutions only consider the current user attention position).

Among other things, to the following provides a system and methods for device interaction using a pointing device and attention sensing device, that addresses at least some of the problems or deficiencies associated with prior solutions.

The following also provides a solution that is understandable to the end user, so he or she may create a mental model of the system paradigm that matches the reality of the algorithms employed.

The following also provides a solution that is easily adaptable to the accuracy available from the attention sensing device, so that it can be easily employed for various devices capable of outputting attention sensing information.

The following is directed to a system and methods for device interaction using a pointing device and attention sensing device.

FIG. 1 provides an overview of various components associated with the system. A pointing device 100 is manipulated by the user, and provides two outputs: the change in position created by the pointing device ($\Delta Pd$ (x,y), or 102), and a gesture g or 104 that is a member of a set of supported gestures G or 140 (i.e. $g \in G$). It should be understood that this change in position 102 is generally used by a control interface to change a cursor's position 128 in an interactable environment. In a traditional pointing control interface, the change in position 102 is directly mapped to change the final position of the cursor, 128. However, the system described herein considers more than just the change 102 when determining the cursor position 128.

An attention sensing device 106 provides a position estimate of where the user is directing his or her attention. The attention position estimate (Pa (x,y), or 108) can vary in accuracy depending on the nature of the attention sensing apparatus used.

Both the attention position 108 and the cursor position 128 are then fed into separate mappers, to associate them with a predefined set of regions, R or 150. A Cursor-to-Region Mapper 110 associates the cursor position 128 with a region r_c or 112, within the set R or 150 (i.e. $r\_c \in R$). Similarly, an Attention-to-Region Mapper 114 associates the attention position 108 with a region r_a or 116 within the set R or 150 (i.e. $r\_a \in R$). It should be noted that both the region mappers 110 and 114 take as input a position and output that same position. This was described as such both for clarity and flexibility. In many embodiments of the system, the region mappers will not change the considered position, meaning that they act as a pass-through for this data. However, an embodiment could decide to modify the input position based on the regions considered.

In parallel to the described region mappers, an object tracker 118 exists, which returns relevant information about the objects 120 being displayed to the user, including in one embodiment: position and size. More integrated object trackers can also deliver additional information, such as the nature of the object, or object z-order (to determine if one object is hidden by another).

Finally, all these outputs: pointing device position displacement 102, pointing device gesture 104, attention position 108, cursor position 128, cursor region 112, attention region 116, and objects 120 are fed to an Attention+Pointing Device Control Interface, 122. The control interface, based on the inputs, will output the following: an output instruction i or 126, that is part of a set of supported instructions I or 160 ($i \in I$), the position at which instruction should be executed (Pi (x,y), or 124), and the updated position of the cursor (Pc (x,y), or 128).

One thing that is not explicitly illustrated in FIG. 1 is where the cursor position 128 is stored. It should be understood that while the control interface could be defined to store and maintain this position, in many embodiments this would not be the case. For example, in a standard operating system the cursor position 128 is handled by the OS itself, with HID devices providing position displacements (such as change in position 102) to the OS, which manages the new position of the cursor. The described control interface 122 (and region mappers 110 and 114) could be a component of the OS itself, or a kernel-mode or user-mode application that interacts with the OS to change the cursor position 128. Thus, where the cursor position is stored is not considered to be important.

Regarding the set of supported gestures 140, it should be understood that these gestures correspond to accepted gestures that the pointing device 100 is capable of outputting. These gestures should be considered as any output the pointing device can send that is distinct from the change in position 102 of the pointing device. In the case where the pointing device is a mouse, some exemplary gestures would be: left-click, middle-click, right-click, middle scroll up, middle scroll down. In the case where the pointing device is a touchpad, some exemplary gestures would be: one-/two-/three-finger click-down, one-/two-/three-finger click-up, two-finger gesture up/down/left/right, three-finger gesture up/down/left/right. For a hand-gesture device, some exemplary gestures would be: closed-fist, open-hand, index-finger extended, hand swipe left/right.

Regarding the predefined set of regions 150, it should be understood that the general goal of these regions is to segment the interactable space for the pointing and attention sensing devices into regions which at least support the accuracy of the attention sensing device. For example, if the interactable space consists of the display of a single monitor, and the attention sensing device can reliably differentiate the user looking at a 2×2 grid within that display, the predefined set of regions 150 may consist of 4 regions that support said 2×2 grid. If, for example, the interactable space consists of 2 displays, and the attention sensing device can reliably differentiate the user looking at a 2×2 grid within one of the displays, and a 1×1 grid within the other display, the set of regions 150 may consist of 5 regions: 4 regions that support the 2×2 grid of the first display, and a single region that covers the second display.

However, the described system is not restricted to defining the set of regions to perfectly match the accuracy of the attention sensing device; it is simply recommended for the regions to never be smaller in size than the supported accuracy of the device. An embodiment of the system may consist of regions that are larger than the accuracy of the device, with the size of the regions more closely matching the expected sizes of the objects the user might interact with. For example, if the objects the user will interact with consists of windows in WIMP interface (windows, icons, menus, pointer), and the windows are expected to always be docked in a 2×1 configuration on a display, the regions may be defined to only consider this configuration. In such a case, an attention sensing device having a higher accuracy can then be used to support sub-region interactions (this will be described later).

Regarding the objects 120, it should be understood that the objects the user will interact with are dynamic. This contrasts with the set of regions 150, which are generally fixed. In an exemplary embodiment, where the objects consist of windows in a WIMP interface, it can be understood that the windows will constantly change in size and position in the interactable space, as they are moved around by the user. In an exemplary embodiment, where the objects consist of interactable elements in a video game, it can be understood that the objects will constantly be changing, depending on the virtual environment the user is located in at each instance in time (as well as the actions the user takes in each environment). Examples of such objects could be: 3D objects the user can interact with, Non-Player Characters the user can talk to, Non-Player Characters the user fights against, and fixed Heads-Up Display elements that the user uses to understand his/her state in the video game.

Figure 2:
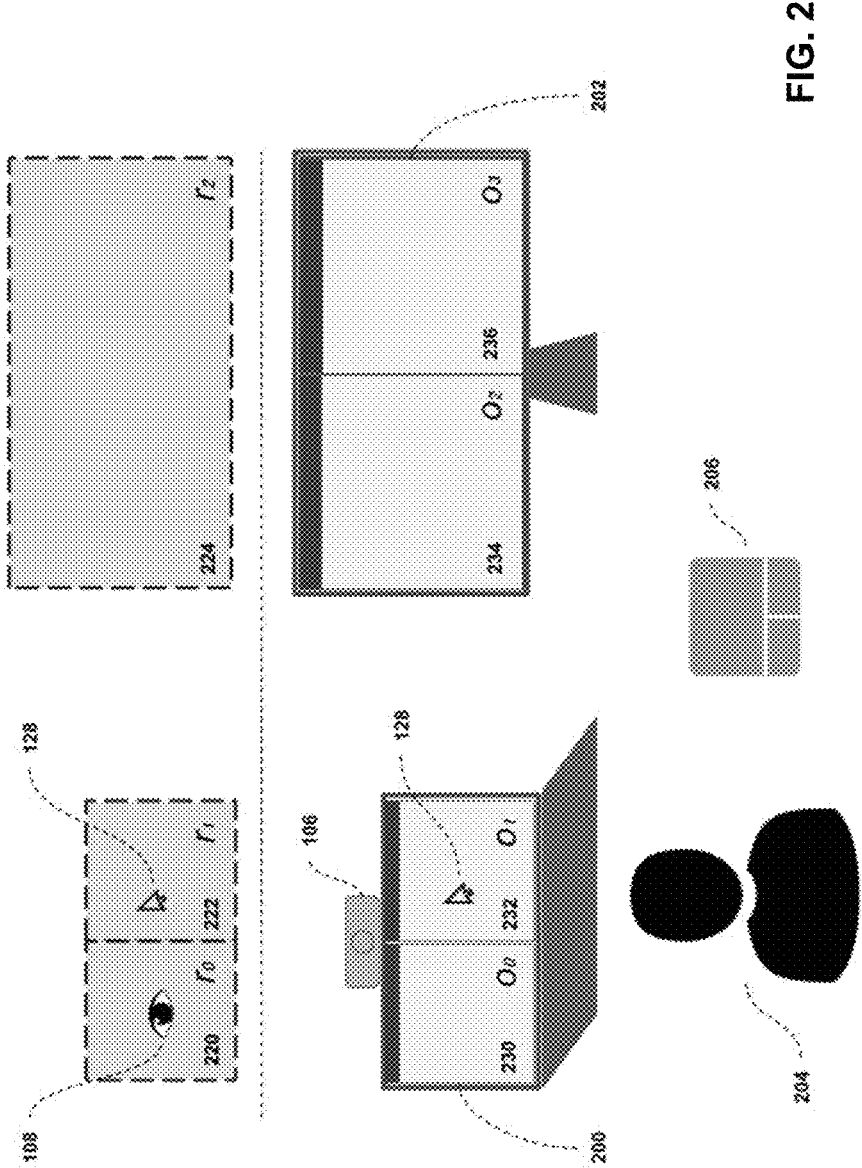
FIG. 2 illustrates a sample environment in which the system and methods could be employed.

FIG. 2 illustrates a sample environment in which the system and methods could be employed. Throughout this description, we will use this sample environment to explain the ways in which the control module handles different scenarios. Before continuing, let it be noted that there are two "views" of the environment: the view at the bottom, which represents the physical environment; and the view at the top, which represents the "virtual" or region environment, as viewed from the Attention+Pointing Device Control interface 122.

Considering the physical environment, the interactable space in this environment is subdivided into two displays 200 and 202. An attention sensing device 106 positioned above the computer display 200 is pointed towards the user 204. The pointing device 206 is here represented as a trackpad, but should be understood as only a sample embodiment. The position of the cursor 128 is represented here, controlled by the control interface 122. Multiple objects 120 are presented on the displays 200 and 202 as windows which can be interacted with by the user 208. The objects 120 considered throughout this description will be defined as: o0 or object 230; o1 or object 232; o2 or object 234; and o3 or object 236.

Considering the "virtual" or region environment, we can see elements r0, r1 and r2 which correspond to regions of the predefined set of regions 150 that the pointing-to-region mapper 110 and attention-to-region mapper 114 can use as a valid output. The attention position 108 of the user's attention is visualized here by an eye icon. The cursor position 128 is also represented within the "virtual" environment view. For consideration throughout the description, the regions 150 considered will be defined as: r0 or region 220; r1 or region 222; and r2 or region 224.

Figure 3:
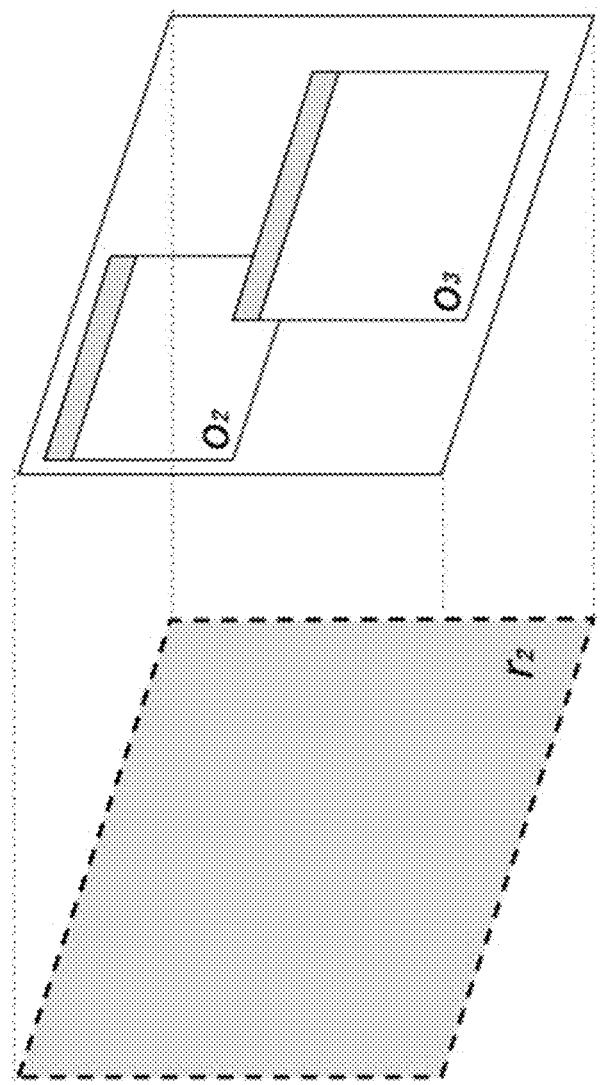
FIG. 3 illustrates an example of a region whose area contains multiple objects.

FIG. 3 illustrates an example of a region whose area contains multiple objects. In this sample case, the region encompasses the entirety of a display on which two objects are present. As will be explained further in the description, the system needs to account both for the case where there is a one-to-one mapping between a region and an object (or more generally if one region maps to one object), as well as the case where there is not a one-to-one mapping, because there are multiple objects within a single region. This case is important, because it defines a situation where the control interface 122 cannot determine which object to send a command to (from a pointing device gesture sent). The control interface 122 needs to account for this case, as will be described later.

Figure 4:
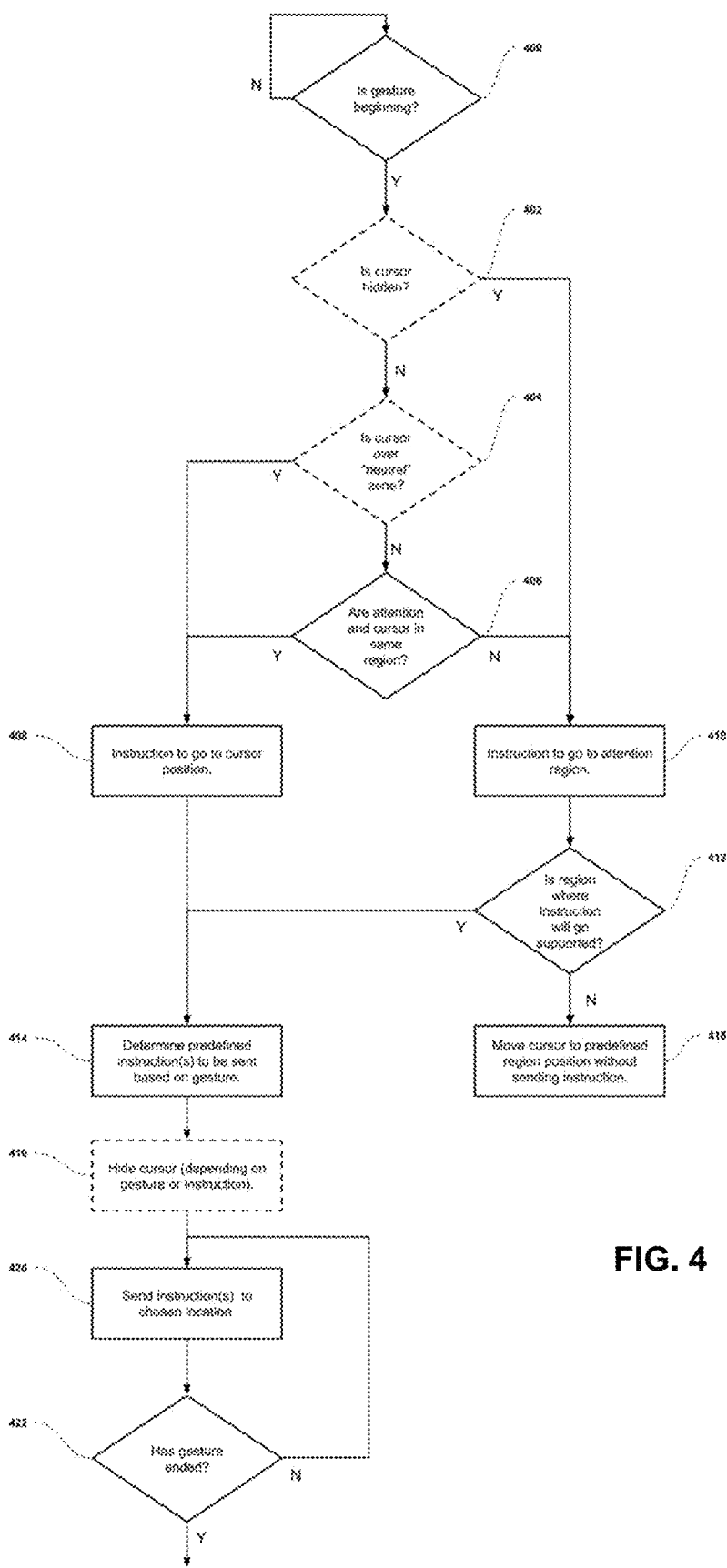
FIG. 4 describes a sample embodiment of the logic used by the Attention+Pointing Device Control Interface to manage input gestures.

FIG. 4 describes a sample embodiment of the logic used by the Attention+Pointing Device Control Interface 122 to manage input gestures. The algorithm described is used to (a) determine where a gesture's associated instruction(s) should be sent based on the location of the cursor and the attention position associated to the user; and (b) either send the instruction associated with the input gesture to the defined location, or assist the user if such an action cannot be taken.

At step 400, the control interface 122 actively waits for a gesture to begin. Once a gesture has been detected, two separate optional steps are performed: first, at step 402, the algorithm determines if the cursor is currently hidden or not. This is to account for a system where the cursor is hidden after a predetermined period of time of the user not moving it. Such a system ensures there is a high correlation between the cursor being visible and the user wanting to use the cursor. Additionally, it ensures there is a high correlation between the cursor being visible and the user knowing where the cursor is. Why this is notable is described below. If, at step 402, the algorithm determines the cursor is currently hidden, it proceeds to step 410, defining the location where an instruction will be sent to be associated to the current attention region. The explicit position within the attention region where the instruction will be sent depends on the embodiment of the system; some examples include: a predefined position of the region (such as its midpoint); the last known position of the cursor within that region; and the last known position of the cursor within the singular object within that region.

If, at step 402, the algorithm determines the cursor is not hidden, it proceeds to the second optional step 404, where it determines if the cursor position 128 is over a "neutral zone". By this, we refer to a predefined region from a predefined set of regions dubbed a "Neutral Zone" set. It is important to note that said neutral zone set can be a null set, if no "neutral zone" regions are required. It should be noted that the purpose of this set of "neutral zone" regions exists to account for regions where we want to enforce or ensure that any instruction is sent to the cursor position. An example of this is a main taskbar of an operating system, where the system functionality could be broken if an incorrect attention point estimate sent the gesture's instruction to the wrong location. If the cursor is positioned over a neutral zone, the position at which the instruction will be outputted will be the position of the cursor, set at step 408.

If the cursor position is not in a neutral zone, the algorithm then determines, at step 406, if the attention region 116 and cursor region 112 correspond to the same region. If they do, the position at which the instruction will be outputted will be the position of the cursor, set at step 408. If the attention and cursor positions are in different regions, the position at which the instruction will be outputted will be associated with the attention region, as described at step 410.

The logic of the decision of step 406 is further explained as follows: when possible, we want to send the instruction associated with a gesture to the location associated with user attention, but also the location the system can predict with the highest accuracy. Therefore, if the attention region and the cursor region are the same, the system can make the assumption that the user is using his or her cursor. Thus, the system sends the instruction to the position of the cursor. The main situation where this would not be the case is if the user has stopped using their cursor, and thus forgotten where it is located. This is remedied by hiding the cursor after a predetermined period of time, which and will be referenced herein (and optional step 402 relates to).

Returning to step 408, let us elaborate on the final steps the algorithm takes (under this scenario). Following this step, the control interface will proceed to step 414, where a predefined instruction (or instructions) will be decided on based on the input gesture. For this, there exists a defined mapping that, given an input gesture, outputs the associated instruction that is to be sent. In a more complicated embodiment, the mapping may take in information about the object or region where the instruction will be sent. In such a case, the mapping may determine different instructions based on the same gesture being sent to two different objects or regions.

After this, an optional step 416 can be implemented: depending on the gesture input or chosen instruction, it may be desirable to hide the cursor. This makes sense if the control interface 122 is configured to handle cursor hiding. Example touchpad gestures where hiding the cursor would make sense could be: two-/three-/four-finger scroll left/right/up/down, and pinch-to-zoom. Examples touchpad gestures where hiding the cursor does not make sense could include: one-/two-/three-/four-finger click up/down, and one-/two-/three-/four-finger tapping.

After the instruction is determined and the optional cursor hiding has been performed, the instruction is sent to the chosen location at step 420. However, depending on the gesture, being performed, the interaction may not yet be finished. That is, some gestures may continue until something signals the gesture end. An example of a gesture that is not continuous is a tap-click. Examples of gestures that are continuous with defined endings are: a click, involving a click-down and a click-release; and a scroll gesture, where the beginning of scrolling indicates the beginning of the gesture, and the release of fingers from the touchpad indicates the end of the gesture. Thus, at step 422, the control logic determines if the gesture has ended. If not, it returns to step 420, where the next instructions will be sent. If it has ended, it finalizes this gesture interaction.

It should be reiterated that the determination of where the gesture will be sent happens at the beginning of the gesture (at step 408 or 410), and does not change while the gesture is performed. This means the gesture can be "locked" to a region once it begins. A good example here is a scroll gesture: as long as the user maintains scrolling, the associated instructions will be sent to the region and location decided upon at the beginning. This avoids the scrolling action switching between windows as a user looks around during the scroll. It also avoids errors in the attention sensing device causing the device to switch scroll location.

For clarity, it may be noted that the paths followed by step 408 of the algorithm are effectively equivalent to a standard pointing device control interface. That is, these are the cases where the gesture provided by the pointing device is mapped to an instruction, and the instruction is sent directly to the cursor position 128. The alternate cases, represented by step 410, represent the scenario where the user's attention does not match the cursor location. These remaining aspects of the control logic will be elaborated below.

If the control interface 122 has decided to send the command to the attention region (i.e. step 410), it first determines if the attention region to which the command is to be sent is a supported region, at step 412. A supported region can be defined as a region where there is a one-to-one mapping between the region and an object within it. If, as in FIG. 3, there exist multiple objects in the region, the region is deemed as unsupported, since it is not clear which object the user was trying to interact with.

If the control interface 122 decides that the attention region is supported, the algorithm proceeds to step 414, where the instruction is determined, and the gesture process continues as described earlier. If the region is deemed not supported, the algorithm proceeds to step 418, where the cursor position 128 is moved to the center of the current attention region 116. In doing this, two things are accomplished: (i) the user is given feedback that control interface 122 cannot determine which object to send the gesture's instruction to; and (ii) the algorithm is making the attention region 116 equivalent to the cursor region 112. In performing (ii), it ensures that any follow-up gestures will go to the cursor position (according to the defined algorithm). Thus, the user only needs to move within the defined region in order to clarify which object (and where within the object) he/she wants to send the gesture's instruction.

FIG. 5 illustrates the gesture logic case where step 406 is not true; that is, where the attention region 116 and cursor region 112 are not the same, and a gesture is sent. FIG. 5A represents the state of the system as the gesture is initiated, and FIG. 5B the state of the system once the command(s) have been outputted by the control interface 122.

Once the gesture is initiated (in this example a two-finger up or down gesture), the control interface 122 begins its analysis of the situation. In this particular case, the attention position 108 is located in region r0 or 220, while the cursor position 128 is located in region r1 or 222, and not in any neutral zones. The control interface 122 thus sets the position of the output instruction to region r0 or 220, in accordance with determining the regions are not the same in step 406.

Once the position of the outputted instruction has been assessed, the control interface 122 determines if the gesture is compatible with the targeted region. This example represents a situation where the gesture is compatible with the target region, since there is a one-to-one-mapping between region r0 or 220, and object o0 or 230. As such, FIG. 5B shows the resulting command being outputted to a predetermined location within region r0 or 220, which corresponds to a location within object o0 or 230, while the cursor 128 remains unmoved.

FIG. 6 illustrates another gesture logic case where step 406 is not true; that is, where the attention region 116 and cursor region 112 are not the same, and a gesture is sent. FIG. 6A represents the state of the system as the gesture is initiated, and FIG. 6B the state of the system once the command(s) have been outputted by the control interface 122. In accordance with FIG. 2, it can be assumed here that the attention tracking device 106 is located on the primary display, not shown here. It can also be assumed that the cursor 128 is located on the main display and is not on a neutral zone.

Once the gesture is initiated (in this case a two-finger up or down gesture), the control interface 122 begins its analysis of the situation. In this case, the attention position 108 is located in region r2 or 224, which encompasses two objects 234 and 236. The cursor is not on a neutral zone, and the attention region 116 and cursor region 112 are not the same. Therefore, the output instruction will be routed to the region of attention r2 or 224, in accordance with the decision of step 406.

However, region r2 or 224 is currently an unsupported region, due to the presence of 2 objects (234 and 236) within its borders (meaning there is not a one-to-one mapping between region and object). This means the control interface 122 will move the cursor to a predetermined position within the attention region (in this case the center of region r2 or 224), as described by steps 412 and 418. In doing so, it allows the user to quickly move the cursor position to the object of interest (and location within said object) that he/she wants to interact with and send a repeat gesture.

Figure 7B:
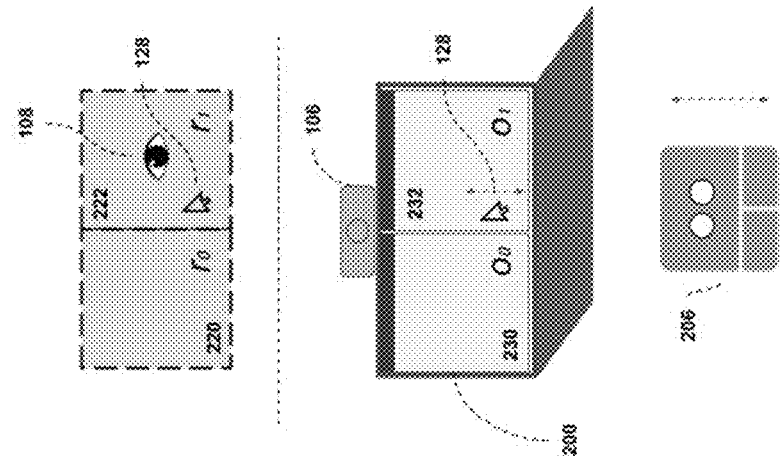
FIGS. 7A and 7B illustrate the gesture logic case where the attention region and cursor region are the same.
Figure 7A:
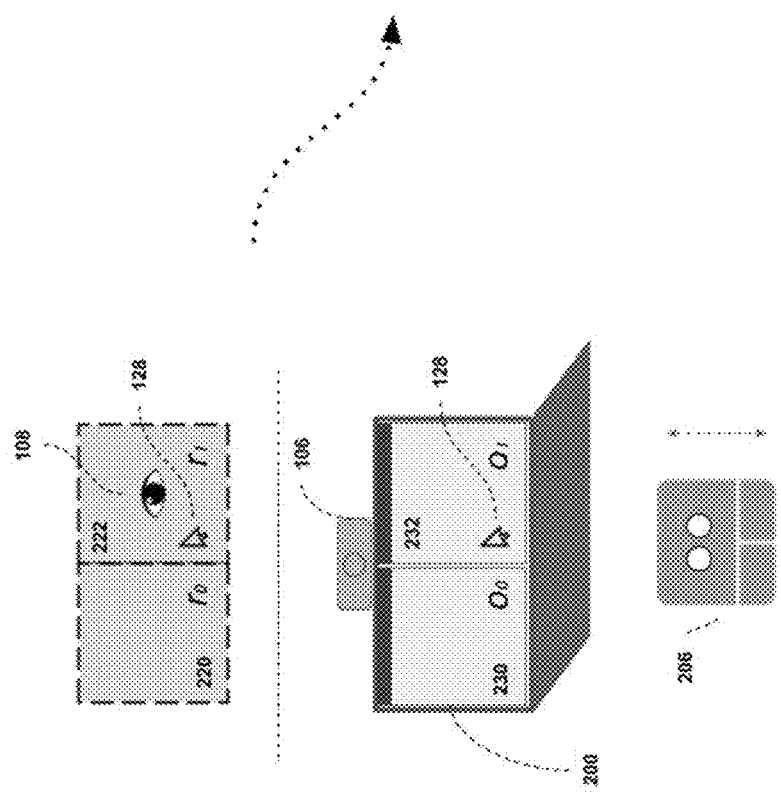

FIG. 7 illustrates a gesture logic case where step 406 is true; that is, where the attention region 116 and cursor region 112 are the same, and a gesture is sent. FIG. 7A represents the state of the system as the gesture is initiated, and FIG. 7B the state of the system once the command(s) have been outputted by the control interface 122.

Once the gesture is initiated (in this case a two-finger up or down gesture), the control interface 122 begins its analysis of the situation. The cursor is not on a neutral zone. Additionally, both the attention region 116 and cursor region 112 correspond to the same region r1 or 222. Therefore, the output instruction will be routed to the cursor position 128, in accordance with the decision of step 406 and step 408. As mentioned previously, this is the standard behavior expected from a traditional pointing device interface and is thus essentially transparent to the user.

FIGS. 8A and 8B illustrate an equivalent scenario to that described in FIG. 5, except with the added concept of sub-regions. As described previously, sub-regions may be desired if (a) the attention sensing device accuracy is higher than that of the defined regions, and (b) the interaction scheme involves doing different things depending on where in a particular region the user is looking.

In this example, sub-regions 226 and 228 are defined, corresponding to the top areas of regions 220 and 222, respectively. Here, once it is deemed that the attention and cursor regions are not the same (in step 406), and that the region is a supported region (in step 412), step 414 would traditionally be performed (where the instruction to be sent is determined based on the gesture provided). The support of sub-regions allows step 414 to be modified, such that the instruction to be sent is determined based not just on the gesture provided, but also on the attention position 108 within the region. Particularly, a different instruction can be sent if the user's attention position 108 is within sub-region 226 or not. In the case where it is not in the sub-region, a standard instruction (such as scrolling the window) can be sent. In the case where it is within the sub-region, an associated "tabbed" interaction instruction can be sent, such as switching the active tab based on the two-finger up/down gesture.

The concept of a sub-region "tabbed" interaction interplays well with a WIMP interface, where tabbed interfaces are more and more common. In this case, the control interface 122 can permit the same gesture to map to different instructions, based on whether the user is looking at a "tabbed" region, or the general window. It should also be noted that, if the paradigm does not involve hiding the cursor when not in use, it may be desirable to have the sub-region check override the cursor-attention region equivalent check (i.e. step 406). Put another way, it may be desired to have the location where the instruction will be sent go to a predefined location within the attention region whenever the attention position 108 intersects with a sub-region.

Although this example focused on "tabbed" interactions and the value of sub-regions for them, it should be understood that sub-region detection could be valuable for other interaction schemes and is not limited to this specific example.

Figure 9:
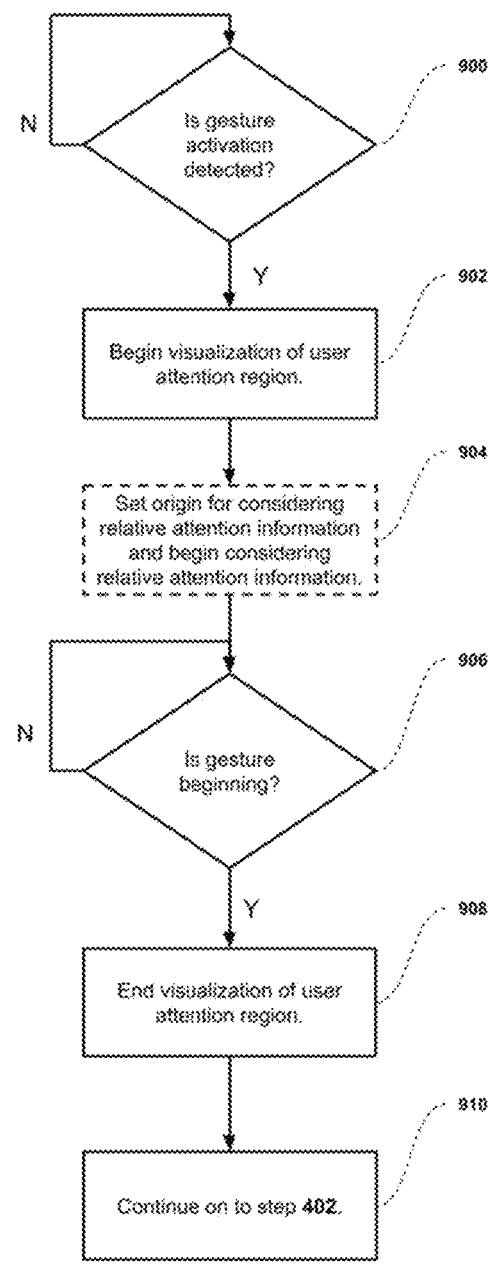
FIG. 9 describes an extended embodiment of the Attention+Pointing Device Control described in FIG. 4, allowing visual feedback and relative user attention enablement.

FIG. 9 describes a sample embodiment of the gesture logic used by the Attention+Pointing Device Control Interface 122 to allow (i) visual feedback to the user, and (ii) relative vs. absolute attention consideration when inputting gestures. It can be considered an extension of the input gesture management described by FIG. 4. The general flow of the logic is to: (a) detect if the user has provided a "gesture activation", indicating they will be sending a gesture shortly; (b) perform the extension step to complement the gesture management logic of FIG. 4; and (c) continue on to the logic of FIG. 4 to finalize the gesture management.

The first extension allows providing visual feedback to the user. The concept is that the user will provide a "gesture activation", meaning some input indicating they are about to send a gesture. Some exemplary gesture activations for a touchpad could be: resting one- (or more) fingers on the touchpad; or a one- (or more) finger click-down. Providing this "gesture activation" indicates to the control logic to begin visualizing the attention region r_a or 116 to the user. Some examples of visualizing this could be: displaying a semi-transparent rectangle with the dimensions of 116 wherever the user is looking; and providing a strobing border with the dimensions of 116 wherever the user is looking. This allows the user to see which attention region the attention sensing device 106 believes he or she is looking at, and modify their attention to choose the desired attention region.

This visual feedback, in addition to being generally useful feedback to the user, can be essential depending on the attention characteristics used to determine the user attention position 108. For example, some attention sensing devices may provide both the user's eye point-of-intersection and head pose point-of-intersection in the interactable space; in the latter case, users are less likely to be certain of where their point-of-intersection is. It may also prove useful if the attention sensing device 106 is not very accurate in terms of its eye point-of-intersection estimate. In both cases, the visual feedback allows the user to either navigate to the desired region or use a defined "clutch" to cancel the interaction. By "clutch", we refer to a predefined input gesture 104, attention position 108, or combination of the two, which the user may input to cancel out of the interaction.

When referring to activation gestures, we should also clarify the importance of clearly defining the gestures, with their associated beginning, ending, and potential activations. It should be clear at this point that a defined gesture can consist of a sequence of "atomic" gestures, or a single atomic gesture. To emphasize this, let us consider the example gesture of a click on a touchpad. This can include the following atomic gestures: fingers being placed on the touchpad; a click-down; a click-up; and fingers being removed from the touchpad. The click-down could be defined as the activation gesture, or it could be defined as the gesture beginning. In the first case, the click-up will likely define both the gesture beginning and ending (making the interaction immediate). In such a case, the click-down will start providing visual feedback to the user, and the click-up will finalize the location where the gesture's instruction(s) will be sent. In the second case, either there is no activation gesture (and no visualization), or the activation gesture is linked to fingers being placed on the touchpad. Given all this, a user-friendly embodiment of the control logic could decide to make a single activation gesture for all potential input gestures (for example, any finger being placed on a touchpad).

The second extension allows notification of the attention sensing device 106 to begin outputting relative positional data as attention positions 108. The concept here is simple: some attention sensing devices may not be very accurate in their absolute estimation but may be acceptably accurate relatively. That is, if the data they output can be "calibrated" to output relative to a new, predefined origin position, it may prove accurate enough for certain instructions. An example to clarify: in sub-region case described by FIG. 8, it is possible the attention sensing device 106 being used is not accurate enough to properly distinguish between the top sub-region and the main region (i.e. it is not accurate enough in the Y-axis). An embodiment where the relative position is considered would allow the user to, upon sending an "activation gesture", set the Y-axis estimate of the attention sensing position 108 to be perfectly in the middle of the current attention region 116. In doing so, the system is making the assumption that the user's actual attention was focused on the middle of that region when he or she initiated the "activation gesture". Then, the user would simply need to "raise" their attention along the Y-axis to select the sub-region. Of course, if the assumption were incorrect (and/or the assumption were not presented to the user as such), the system would fail. It should also be clear that this second extension is highly dependent on visual feedback. Because of the above, we consider this second extension an optional extension for this embodiment of the gesture logic.

It can be understood from this that "gesture activations" are, in most cases, gestures themselves by our definition. Thus, there exists a set of gesture activations A or 940, which is a subset of the set of accepted input gestures G or 140.

Returning to FIG. 9, let us walk through the steps to summarize. Step 900 detects whether a gesture activation has been sent. As discussed previously, since gesture activations are simply a subset of supported gestures, this is similar to step 400 in FIG. 4. Once a gesture activation is detected, the embodiment begins visualization of user attention region 116, at step 902. Immediately afterward (or in parallel), at step 904 the control logic can optionally define an attention sensing position origin, and begin requesting attention positions 108 relative to this origin. Next, at step 906, the logic waits until a gesture begins. Once the gesture has begun, at step 908 we end the visualization of user attention region 116, and continue to step 402 of FIG. 4 (as stated in step 910).

Figure 10:
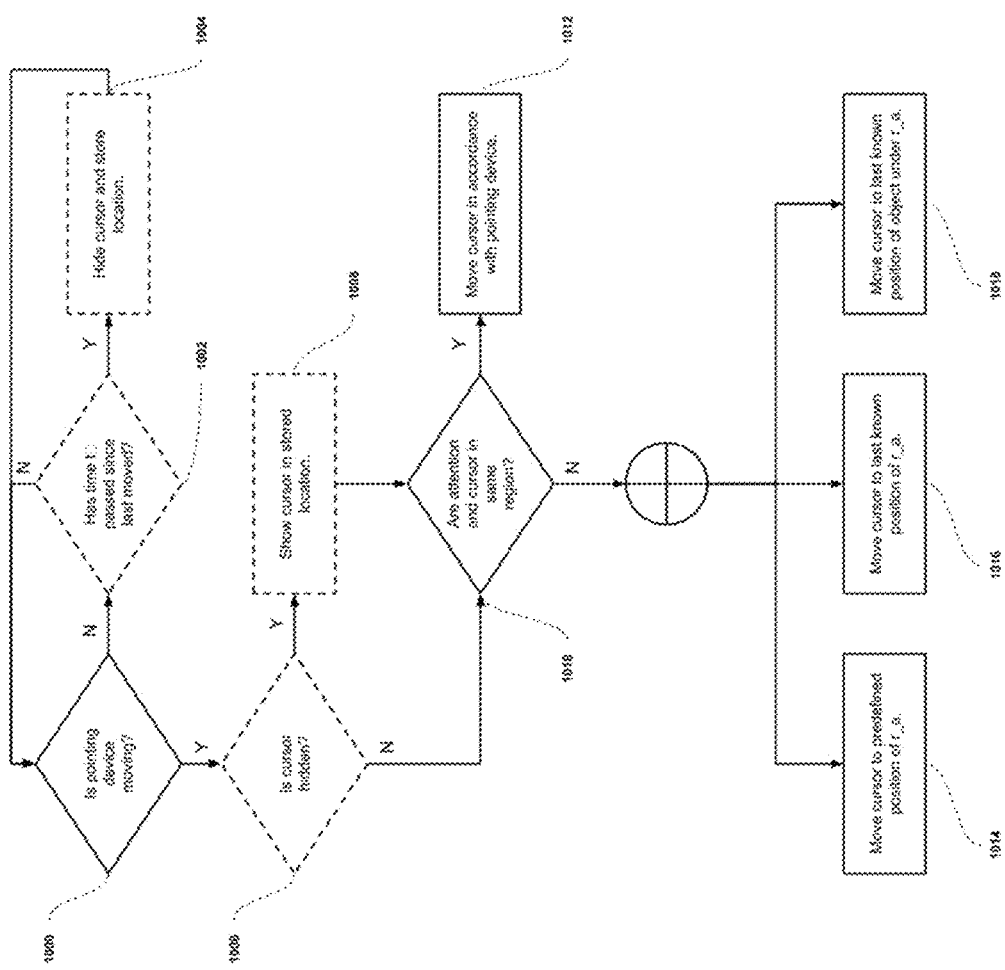
FIG. 10 describes a sample embodiment of the logic used by Attention+Pointing Device Control Interface to manage pointing device motion.

FIG. 10 describes a sample embodiment of the logic used by Attention+Pointing Device Control Interface 122 to manage pointing device motion. The algorithm described is used to (a) determine where the cursor should be moved to in the interactable space; and (b) optionally manage cursor hiding/displaying based on the same data.

At step 1000, the algorithm first checks if the pointing device is moving (i.e. there is a change in position 102). For the optional cursor hiding/displaying, it proceeds to step 1002 if the pointing device is not moving. Here, it checks if sufficient time has passed since pointing device motion has last been received. If not, it proceeds to step 1000. If sufficient time has passed, it proceeds to step 1004, where it stores the current cursor location and hides it. After this, the logic returns to step 1000, to again check if there is pointing device motion.

If, at step 1000, pointing device motion is detected, it proceeds to optional step 1006, to check if the cursor is currently hidden. If not, it proceeds to step 1010. If so, it first re-displays the cursor in its stored location, at step 1008, and then proceeds to step 1010. At step 1010, the algorithm checks if the attention region 116 and cursor region 112 correspond to the same region. If so, it moves the cursor in accordance with the pointing device, at step 1012. This should be understood as traditional pointing device interface logic, where the change in position 102 is mapped directly to the cursor position 128.

If at step 1010, the attention region 116 and cursor region 112 correspond to different regions, the algorithm moves the cursor to a predefined location related to the attention region 116. Some example options of this are: step 1014, where the cursor is moved to a predefined location within the attention region (such as its center); step 1016, where the cursor is moved to the cursor's last known position within this region; and step 1018, where the cursor is moved to the cursor's last known position within the object that is within this region. It should be clear that optional step 1016 assumes that the last known cursor positions in each region within the set of regions 150 is stored. Similarly, step 1018 assumes that the last known cursor positions in each object of the set of objects 120 is stored.

As a last clarification, we will state the algorithm process if cursor hiding/displaying is not employed, In such a case, step 1000 (checking whether the pointing device is moving) will either return to itself (if there is no motion), or proceed to step 1010 (if there is motion). At step 1010, the logic will either proceed to step 1012 if attention region 116 and cursor region 112 are the same, or proceed to one of steps 1014, 1016, or 1018 if the regions are not the same.

FIG. 11 illustrates the cursor control logic case where step 1010 is not true; that is, where the attention region 116 and cursor region 112 are not the same, and a pointing device change in position 102 is received. FIG. 11A represents the state of the system as the change in position is initiated, and FIG. 11B the state of the system once the motion has been processed, and cursor motion outputted by control interface 122.

Once the change in position 102 is received, the control interface 122 begins its analysis of the situation. In this particular case, the attention position 108 is located in region r0 or 220, while the cursor position 128 is located in region r1 or 222. The control interface 122 thus moves the cursor to a predefined position associated with region r0 or 220, in accordance with determining the regions are not the same at step 1010.

At FIG. 11B, the cursor region 112 and attention region 116 are now effectively the same. Therefore, the continuing change in position 102 will proceed in accordance with the pointing device motion, as stated in step 1012.

FIG. 12 illustrates the cursor control logic case where step 1010 is true; that is, where the attention region 116 and cursor region 112 are the same, and a pointing device change in position 102 is received. FIG. 12A represents the state of the system as the change in position is initiated, and FIG. 12B the state of the system once the motion has been processed, and cursor motion outputted by control interface 122.

Once the change in position 102 is received, the control interface 122 begins its analysis of the situation. In this particular case, the attention position 108 and cursor position 128 are both located in region r1 or 222. At FIG. 12B, the control interface 122 thus moves the cursor in accordance with the pointing device motion, as stated in step 1012.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the control interface 122 or other parts of the system, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

1. Amir, A., Flickner, M. D., Ihde, S. C., & Zhai, S. "Integrated gaze/manual cursor positioning system". U.S. Pat. No. 6,204,828B1. 1998 Mar. 31.
2. Stafford, J. R. "Gaze-assisted computer interface". U.S. Pat. No. 8,793,620B2. 2011 Apr. 21.
3. Cederlund, M., Gavelin, R., Vennström, A., Kaplan, A., Olsson, A., & Skogö, M. "System for gaze interaction". US Patent Application US20130169560A1. 2012 Jan. 4.
4. Bouvin, J., & Runemo, P. "Eye tracker with visual feedback". U.S. Pat. No. 8,120,577B2. 2005 Oct. 28.
5. Vertegaal, R., & Shell, J. S. "Method and apparatus for communication between humans and devices". U.S. Pat. No. 7,762,665B2. 2003 Mar. 21.
6. Farrell, S. P., & Zhai, S. "System and method for selectively expanding or contracting a portion of a display using eye-gaze tracking". US Patent Application US20050047629A1. 2003 Aug. 25.
7. Beymer, D., Farrell, S. P., Zhai, S. "System and method for selecting and activating a target object using a combination of eye gaze and key presses". U.S. Pat. No. 9,274,598B2. 2003 Aug. 25.
8. Bjorklund, C., Eskilsson, H., Jacobson, M., & Skogo, M. "Arrangement, method and computer program for controlling a computer apparatus based on eye-tracking". U.S. Pat. No. 8,185,845B2. 2004 Jun. 18.
9. George-Svahn, E., Henderek, D. F., Lanssjö, R., Skogö, M., & Elvesjö, J. "Two step gaze interaction". US Patent Application US20140247232A1. 2013 Mar. 1.
10. Clapper, E. "Controlling cursor of a pointing device". US Patent Application US20020158846A1. 2001 Apr. 30.
11. 석윤찬.. "Input device using eye-tracking". Korean Patent KR101671838B1. 2015 Jun. 17.

The invention claimed is:
1. A system comprising a processor and memory, the memory comprising computer executable instructions for positioning a cursor during user interaction with a scene shown on one or more displays, that when executed by the processor cause the system to:
    receive user input from a pointing device configured to at least detect positional or change-in-positional information;
    receive user attention data from an attention sensing device, wherein the attention data is output as one or more points on the one or more displays;
    receive the current cursor position in the scene from the scene, or estimate the current cursor position in the scene;
    determine an attention region by comparing the attention data to a predefined set of regions within the one or more displays, the predefined regions being defined by respective coordinates and dimensions, and said regions describing a supported granularity of the attention sensing device;
    determine a cursor region from the predefined set of regions, the positional information, and the current cursor position;
    verify whether the attention region and the cursor region do not correspond to the same region once the change-in-positional information has been received from the pointing device; and upon determining that the attention region and the cursor region do not correspond to the same region, send a signal to an operating system or a device interfacing with the operating system to move the cursor to a predetermined location within the attention region; or
    send a signal to the operating system or the device interfacing with the operating system to move the cursor within the cursor region in accordance with the pointing device positional information.

2. The system of claim 1, further configured to: receive from an object tracker coordinate and dimensional information for all objects in the scene.

3. The system of claim 2, wherein the predetermined location that the cursor is moved to is one of:
- a center of the attention region;
- a last known position of the cursor within the attention region;
- a last known position of the cursor within the object closest to the center of the attention region; or
- a last known position of the cursor within the object closest to the last known position of cursor within the attention region.

4. The system of claim 1, further configured to, prior to executing any operations:
- receive a current cursor visible or hidden state from the scene;
- determine whether the current cursor is hidden once change in positional information has been received from the pointing device; and
- upon determining the current cursor is hidden, send one or more signals to the operating system or device interfacing with the operating system to set the current cursor state to visible and to move the cursor to a predetermined location within the attention region; or
- send a signal to the operating system or device interfacing with the operating system to position the cursor following defined logic.

5. A system comprising a processor and memory, the memory comprising computer executable instructions for generating gesture based commands and positioning a cursor during user interaction with a scene shown on one or more displays, that when executed cause the system to:
- receive user input from a pointing device capable of detecting positional or change-in-positional information, and user generated gestures;
- receive user attention data from an attention sensing device, wherein the attention data is output as one or more points on the one or more displays;
- receive the current cursor position in the scene from the scene, or estimate the current cursor position in the scene;
- determine an attention region by comparing the attention data to a predefined set of regions within the one or more displays, the predefined regions being defined by respective coordinates and dimensions, and said regions describing a supported granularity of the attention sensing device;
- determine a cursor region from the predefined set of regions, pointing device positional information, and current cursor position;
- determine whether the attention region and cursor region do not correspond to the same region upon receiving one or more user generated gestures; and
- upon determining the attention region and cursor region do not correspond to the same region, send at least one signal to an operating system or a device interfacing with the operating system to execute at least one user action based on at least one user generated gesture, wherein said user action is executed with a predetermined location within the attention region as a starting point; otherwise,
- send at least one signal to the operating system or the device interfacing with the operating system to execute at least one user action based on at least one user generated gesture, wherein said user action is executed with the current cursor position as a starting point.

6. The system of claim 5, further configured to:
- receive coordinate and dimensional information for all objects in the scene from an object tracker; and
- upon determining the attention region and cursor region do not correspond to the same region, determine whether the attention region contains only one object within it; otherwise
- send at least one signal to the operating system or the device interfacing with the operating system to execute at least one user action based on at least one user generated gesture, wherein said user action is executed with the current cursor position as a starting point; and
- after determining the attention region contains only one object within it, send at least one signal to the operating system or the device interfacing with the operating system to execute at least one user action based on at least one user generated gesture, wherein said user action is executed with a predetermined location within the attention region as a starting point; otherwise
- send a signal to the operating system or the device interfacing with the operating system to move the cursor position to a predetermined location within the attention region.

7. The system of claim 6, wherein the predetermined location that the cursor is moved to is one of:
- a center of the attention region;
- a last known position of the cursor within the attention region;
- a last known position of the cursor within the object closest to the center of the attention region; or
- a last known position of the cursor within the object closest to the last known position of cursor within the attention region.

8. The system of claim 6, wherein the predetermined location used as a starting point for the at least one user action is one of:
- a center of the attention region;
- a center of the object;
- a last known position of the cursor within the attention region;
- a last known position of the cursor within the object closest to the center of the attention region; or
- a last known position of the cursor within the object closest to the last known position of cursor within the attention region.

9. The system of claim 5, further configured to, prior to executing any operations:
- determine whether the current cursor position is within one of a predetermined set of coordinates and dimensions upon receiving one or more user generated gestures; and
- send at least one signal to the operating system or the device interfacing with the operating system to execute at least one user action based on at least one user generated gesture, wherein said user action is executed with the current cursor position as a starting point, upon determining that the cursor position is within a predetermined set of coordinate and dimensions; or
- generate gesture based commands following defined logic and send at least one signal to the operating system or the device interfacing with the operating system to position the cursor accordingly.

10. The system of claim 5, further configured to, prior to executing any operations:
- receive a current cursor visible or hidden state from the scene;

determine whether the current cursor is hidden once one or more user generated gestures have been received; and send at least one signal to the operating system or the device interfacing with the operating system to execute at least one user action based on at least one user generated gesture, wherein said user action is executed with a predetermined location within the attention region, upon determining the current cursor is hidden; or generate gesture based commands based on defined logic and send at least one signal to the operating system or the device interfacing with the operating system position the cursor accordingly.

11. A non-transitory computer readable storage medium comprising computer executable instructions for positioning a cursor during user interaction with a scene shown on one or more displays, including instructions for:

receiving user input from a pointing device configured to at least detect positional or change-in-positional information;

receiving user attention data from an attention sensing device, wherein the attention data is output as one or more points on the one or more displays;

receiving the current cursor position in the scene from the scene, or estimating the current cursor position in the scene;

determining an attention region by comparing the attention data to a predefined set of regions within the one or more displays, the predefined regions being defined by respective coordinates and dimensions, and said regions describing a supported granularity of the attention sensing device;

determining a cursor region from the predefined set of regions, the positional information, and the current cursor position;

verifying whether the attention region and the cursor region do not correspond to the same region once the change-in-positional information has been received from the pointing device; and upon determining that the attention region and the cursor region do not correspond to the same region, sending a signal to an operating system or a device interfacing with the operating system to move the cursor to a predetermined location within the attention region; or sending a signal to the operating system or the device interfacing with the operating system to move the cursor within the cursor region in accordance with the pointing device positional information.

12. The non-transitory computer readable medium of claim 11, further configured to: receive from an object tracker coordinate and dimensional information for all objects in the scene.

13. The non-transitory computer readable medium of claim 12, wherein the predetermined location that the cursor is moved to is one of:

a center of the attention region;
a last known position of the cursor within the attention region;
a last known position of the cursor within the object closest to the center of the attention region; or
a last known position of the cursor within the object closest to the last known position of cursor within the attention region.

14. The non-transitory computer readable medium of claim 11, further configured to, prior to executing any operations:

receive a current cursor visible or hidden state from the scene;

determine whether the current cursor is hidden once change in positional information has been received from the pointing device; and upon determining the current cursor is hidden, send one or more signals to the operating system or device interfacing with the operating system to set the current cursor state to visible and to move the cursor to a predetermined location within the attention region; or send a signal to the operating system or device interfacing with the operating system to position the cursor following defined logic.

15. A non-transitory computer readable medium comprising computer executable instructions for generating gesture based commands and positioning a cursor during user interaction with a scene shown on one or more displays, including instructions for:

receiving user input from a pointing device capable of detecting positional or change-in-positional information, and user generated gestures;

receiving user attention data from an attention sensing device, wherein the attention data is output as one or more points on the one or more displays;

receiving the current cursor position in the scene from the scene, or estimating the current cursor position in the scene;

determining an attention region by comparing the attention data to a predefined set of regions within the one or more displays, the predefined regions being defined by respective coordinates and dimensions, and said regions describing a supported granularity of the attention sensing device;

determining a cursor region from the predefined set of regions, pointing device positional information, and current cursor position;

determining whether the attention region and cursor region do not correspond to the same region upon receiving one or more user generated gestures; and upon determining the attention region and cursor region do not correspond to the same region, sending at least one signal to an operating system or a device interfacing with the operating system to execute at least one user action based on at least one user generated gesture, wherein said user action is executed with a predetermined location within the attention region as a starting point; otherwise, sending at least one signal to the operating system or the device interfacing with the operating system to execute at least one user action based on at least one user generated gesture, wherein said user action is executed with the current cursor position as a starting point.

16. The non-transitory computer readable medium of claim 15, further configured to:

receive coordinate and dimensional information for all objects in the scene from an object tracker; and upon determining the attention region and cursor region do not correspond to the same region, determine whether the attention region contains only one object within it; otherwise send at least one signal to the operating system or the device interfacing with the operating system to execute at least one user action based on at least one user generated gesture, wherein said user action is executed with the current cursor position as a starting point; and after determining the attention region contains only one object within it, send at least one signal to the operating system or the device interfacing with the operating system to execute at least one user action based on at least one user generated gesture, wherein said user action is executed with a predetermined location within the attention region as a starting point; otherwise send a signal to the operating system or the device interfacing with the operating system to move the cursor position to a predetermined location within the attention region.

17. The non-transitory computer readable medium of claim 16, wherein the predetermined location that the cursor is moved to is one of:
a center of the attention region;
a last known position of the cursor within the attention region;
a last known position of the cursor within the object closest to the center of the attention region; or
a last known position of the cursor within the object closest to the last known position of cursor within the attention region.

18. The non-transitory computer readable medium of claim 16, wherein the predetermined location used as a starting point for the at least one user action is one of:
a center of the attention region;
a center of the object;
a last known position of the cursor within the attention region;
a last known position of the cursor within the object closest to the center of the attention region; or
a last known position of the cursor within the object closest to the last known position of cursor within the attention region.

19. The non-transitory computer readable medium of claim 15, further configured to, prior to executing any operations:

determine whether the current cursor position is within one of a predetermined set of coordinates and dimensions upon receiving one or more user generated gestures; and send at least one signal to the operating system or the device interfacing with the operating system to execute at least one user action based on at least one user generated gesture, wherein said user action is executed with the current cursor position as a starting point, upon determining that the cursor position is within a predetermined set of coordinate and dimensions; or generate gesture based commands following defined logic and send at least one signal to the operating system or the device interfacing with the operating system to position the cursor accordingly.

20. The non-transitory computer readable medium of claim 15, further configured to, prior to executing any operations:
receive a current cursor visible or hidden state from the scene;
determine whether the current cursor is hidden once one or more user generated gestures have been received; and
send at least one signal to the operating system or the device interfacing with the operating system to execute at least one user action based on at least one user generated gesture, wherein said user action is executed with a predetermined location within the attention region, upon determining the current cursor is hidden; or
generate gesture based commands based on defined logic and send at least one signal to the operating system or the device interfacing with the operating system position the cursor accordingly.

\* \* \* \* \*